United States Patent [19]
Comino et al.

[11] Patent Number: 5,748,681
[45] Date of Patent: May 5, 1998

[54] OFFSET CORRECTION FOR A HOMODYNE RADIO

[75] Inventors: Vittorio Comino, Keansburg; Gerard Joseph Foschini, South Amboy; Isam M. Habbab, Old Bridge; Sanjay Kasturia, Middletown; Jack Salz, Fair Haven, all of N.J.; Michael Edward Prise, Kirkland, Wash.; Ravi Subramanian, Palo Alto, Calif.

[73] Assignee: Lucent Technologies Inc., Murrvay Hill, N.J.

[21] Appl. No.: 549,363

[22] Filed: Oct. 27, 1995

[51] Int. Cl.⁶ ..................... H04L 25/06
[52] U.S. Cl. ........... 375/319; 327/307; 327/559
[58] Field of Search ............... 375/319, 317; 327/307, 72, 73, 559; 455/324, 296; 329/320, 318, 349, 353

[56] References Cited

U.S. PATENT DOCUMENTS

| | | | |
|---|---|---|---|
| 4,873,702 | 10/1989 | Chiu | 375/319 |
| 5,027,352 | 6/1991 | Goode | 370/345 |
| 5,212,826 | 5/1993 | Rabe et al. | 455/214 |
| 5,319,679 | 6/1994 | Bagby | 375/354 |

Primary Examiner—Stephen Chin
Assistant Examiner—Betsy L. Deppe

[57] ABSTRACT

DC offset cancellation and timing recovery is provided in a homodyne receiver. The homodyne receiver demodulates an RF signal to produce a baseband signal. An initial offset correction module determines an initial DC offset of the baseband signal. An initial offset correction is applied to the baseband signal to provide an initial corrected baseband signal. Wherein, a dynamic DC offset correction module determines a dynamic DC offset. A dynamic DC offset correction is applied to the initial corrected baseband signal providing a dynamic corrected baseband signal. A timing signal is acquired from the baseband signal for synchronizing the receiver to a transmitter. A method for correcting DC offset of a baseband signal in a homodyne receiver is also described.

26 Claims, 3 Drawing Sheets

5,748,681

OFFSET CORRECTION FOR A HOMODYNE RADIO

FIELD OF THE INVENTION

This invention relates to a communications system, and more particularly to baseband signal offset correction in a homodyne receiver.

BACKGROUND OF THE INVENTION

Homodyne radio receivers have a far greater potential for integration than a conventional heterodyne or super-heterodyne receiver. In a conventional heterodyne radio receiver the radio frequency (RF) frequency is mixed with a signal from a local oscillator to produce an intermediate frequency (IF). Several IF stages are often used in a single heterodyne receiver. The filtering and gain is partitioned among the various IF stages. A homodyne radio receiver provides direct conversion in which the RF frequency is mixed directly to the baseband. The direct conversion to baseband by a homodyne radio receiver, which in effect has an IF frequency of 0, has the significant advantage in that the various IF stages and their associated oscillators and filters are eliminated. The filtering is done at baseband utilizing low power, high density integrated circuits rather than large ceramic and surface acoustic wave filters which are necessary for IF filtering.

The use of a homodyne radio receiver requires that gain, gain control and filtering must be very carefully worked as the non linear effects of the corresponding circuits can result in overloading the receiver and undesirable signals from outside the channel causing interference. DC offsets and changes in the DC offsets as a result of circuit effects and local oscillator leakage pose a problem as well.

Leakage of the local oscillator into the RF port of the mixer results in a DC offset of the In phase signal and Quadrature signal (IQ). The DC offset interferes with the signal and must be corrected for.

In a 4-CPFSK system which is utilized in an ISM band cordless telephone a DC offset of 5% in the In phase signal and Quadrature signal channels results in significant signal degradation. It is therefore necessary that the DC offset must be reduced to less than 5%. In a time division duplexed (TDD) system, the radio transmits a frame then receives a frame. The DC offset is likely to change at the frame rate, which is typically several hundred hertz.

When the communication system hops frequencies the DC offsets also change with corresponding changes in frequency. The frequency hops are pseudo random, which requires that the DC offset be reacquired with each hop. In a TDD frequency hopping signal communication system there is a different DC offset for each received frame which must be removed.

SUMMARY OF THE INVENTION

The present invention is a device for providing DC offset correction in a homodyne receiver. In one preferred embodiment, the homodyne receiver demodulates an RF signal to produce a baseband signal having a DC offset. A dynamic DC offset correction circuit determines a dynamic DC offset and applies a dynamic DC offset correction to the baseband signal. In a further enhancement an initial offset correction circuit determines an initial DC offset of the baseband signal. An initial offset correction is applied to the baseband signal to provide an initial corrected baseband signal. In a still further enhancement a timing signal is acquired from the baseband signal for synchronizing the receiver to a transmitter.

A method for correcting DC offset of a baseband signal in a homodyne receiver in accordance with the present invention is described. The method includes the steps of determining a dynamic DC offset of the baseband signal and applying a dynamic offset correction to the baseband signal. In an enhancement, a further step of determining an initial DC offset of the baseband signal and applying an initial offset correction to the baseband signal before determining the dynamic DC offset is provided. In a further enhancement, the additional step of acquiring a timing signal from the baseband signal for synchronization to a transmitter is provided. In yet a further enhancement the additional step of switching a high pass filter from a first predetermined frequency cutoff to a second predetermined frequency cutoff after acquiring the timing signal is provided.

DESCRIPTION OF THE DRAWINGS

The present invention is described in detail below in conjunction with the drawings, of which.

DETAILED DESCRIPTION OF VARIOUS ILLUSTRATIVE EMBODIMENTS

Although the present invention, a homodyne receiver offset cancellation and timing recovery system, is particularly well suited for use with a time division duplex (TDD) frequency hopping signal communication system and shall be described with respect to this application, the methods and apparatus disclosed here can be applied to other communication systems using a homodyne receiver, including a communication system operating in the optical bandwidth.

Figure 1A:
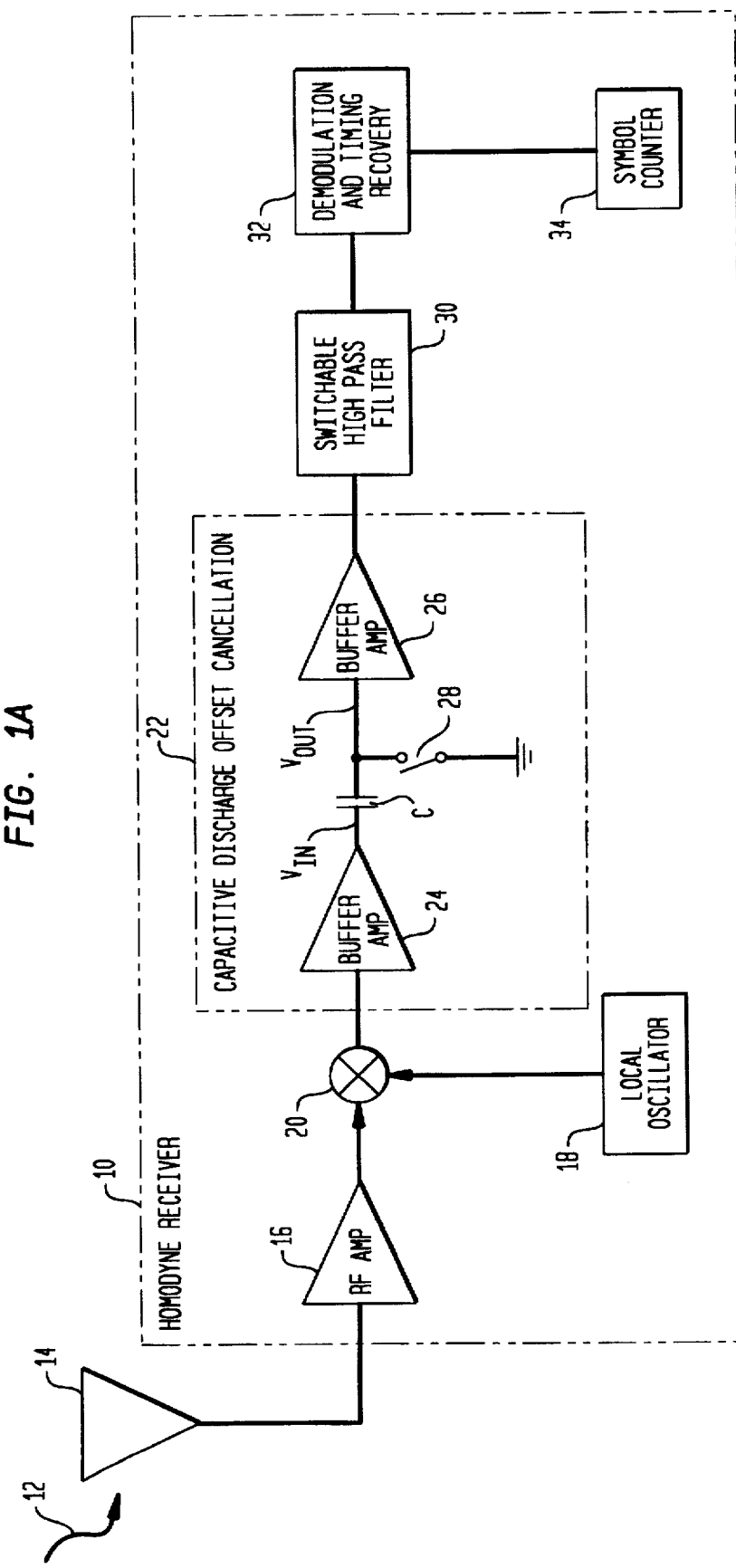
FIG. 1A is an illustration of a homodyne communication receiver with DC offset correction and switched high speed filter.

Referring to FIG. 1A, there is illustrated a block diagram of one preferred embodiment of the present invention as implemented within a homodyne radio receiver 10. The homodyne radio receiver 10 accesses a transmitted RF signal 12 through an antenna 14. An RF amplifier 16 increases the gain of the RF signal 12 to an appropriate level. A local oscillator 18 is operated at or very close to a frequency F, which is centered at the desired channel. The signal produced by the RF amplifier 16 and the signal produced by a local oscillator 18 are combined by a mixer 20. A baseband signal is produced by the mixer 20. An In phase signal and a Quadrature signal (IQ) are generated utilizing an IQ demodulator. The IQ demodulator consists of two mixers and a 90 degrees phase shifter. The output of the mixer 20 is coupled to a capacitive discharge offset cancellation module 22. The output of the capacitive discharge offset cancellation module 22 is coupled to a switchable high pass filter 30. The output of the switchable high pass filter is coupled to the demodulation and timing recovery module 32 which can include the IQ demodulator. The homodyne receiver 10 contains a symbol counter 34 which is set when the receiver 10 and the transmitter (not shown) are fully synchronized.

The capacitive discharge offset cancellation module 22 comprises a first buffer amplifier 24 which is adapted to receive the output signal from the mixer 20, which has a DC offset. A capacitor C is coupled between the output of the first buffer amplifier 24 and the input of a second buffer amplifier 26. The output of the second buffer amplifier 26 is coupled to the switchable high pass filter 30. A switch 28 selectively shunts the input of the second buffer amplifier 26 to ground.

The present invention has principally two modes of operation, an acquire mode and a normal mode. In the acquire mode the system waits for a synchronization frame so that the receiver 10 can lock on to the correct phase of the transmitter (not shown) and lock its symbol counter 34 to the transmitter symbol counter (not shown). The synchronization frame consists a dotting sequence which is followed by a barker word. The receiver 10 must acquire the correct timing within 1/16 of the symbol period in order to have acceptable sensitivity.

When the receiver 10 is turned on, switch 28 is closed, shunting $V_{OUT}$ to ground while $V_{IN}$ has the value $V_{IN}(t_{SET})$. After a short time $t_{SET}$, the switch 28 is opened. $V_{OUT}$ will now track $V_{IN}$, but will be offset by $V_{IN}(t_{SET})$, $$V_{OUT}=V_{IN}-V_{IN}(t_{SET})$$

thus removing the initial large DC offset from $V_{IN}$.

The capacitive discharge offset cancellation module 22 is limited by the on and off resistance of the switch 28, the value of the capacitor C, and the input impedance of the second buffer amplifier 26. The rate at which $V_{OUT}$ is shunted to ground is determined by the value of the capacitor C and the resistance of the switch 28 when on, which define the RC time constant and thus determines the necessary switching time $t_{SET}$. By utilizing a SiCMOS switch for the switch 28 and a small surface mount capacitor for the capacitor C, a switching time close to the order of a symbol period can be obtained. When the receiver 10 is operating in the acquire mode, timing information is not available. Therefore, $V_{IN}(t_{SET})$ may contain the desired signal in addition to the noise from the receiver 10. However, even when $V_{IN}(t_{SET})$ contains the desired signal, the coarse correction by the capacitive discharge offset cancellation module 22 will reduce the DC offset to the order of the signal level, thus the receiver 10 will not be overloaded by the DC offset of the signal.

After the coarse correction for the DC offset, the signal is coupled to the subsequent receiver stages. Prior to the demodulation and timing recovery module 32, the signal is coupled to a switchable high pass filter 30. The switchable high pass filter 30 has a cutoff frequency that is a 1/8 to 1/2 of the channel bandwidth.

The dotting sequence of the data frame is selected to be balanced over as few symbols as possible. Such as for PI/4 DQPSK, a suitable dotting sequence would be 3*PI/4, PI/4. When averaged over 4 symbols, the resulting DC signal content of the In phase and Quadrature signal channels is zero. The switchable high pass filter 30 will then average any offsets in the In phase and Quadrature signals and any transients in the DC offset will rapidly decay to zero. At this point, no significant DC offset is present in the signal and timing can be acquired. It should be noted that the dotting sequence consists of a repeating sequence of 2 symbols, thus during timing recovery, only the data transitions are important. Therefore, the switchable high pass filter 30 does not have a significant impact upon the timing acquisition.

Immediately following the dotting sequence are the security codes and the barker codes, which must be recognized by the receiver 10 so that the receiver symbol counter 34 and the receiver 10 and transmitter (not shown) fully synchronized. A high pass filter necessary to provide rapid DC offset cancellation and timing acquisition is too high to permit demodulation and data decoding. Therefore, when the high pass filter is connected, the barker codes and security codes can not be recognized. This problem is overcome by the present invention by detecting when the timing has been acquired and then switching the cutoff frequency of the high pass filter 30 to a much lower cutoff frequency at which it is possible to decode the data.

Figure 1B:
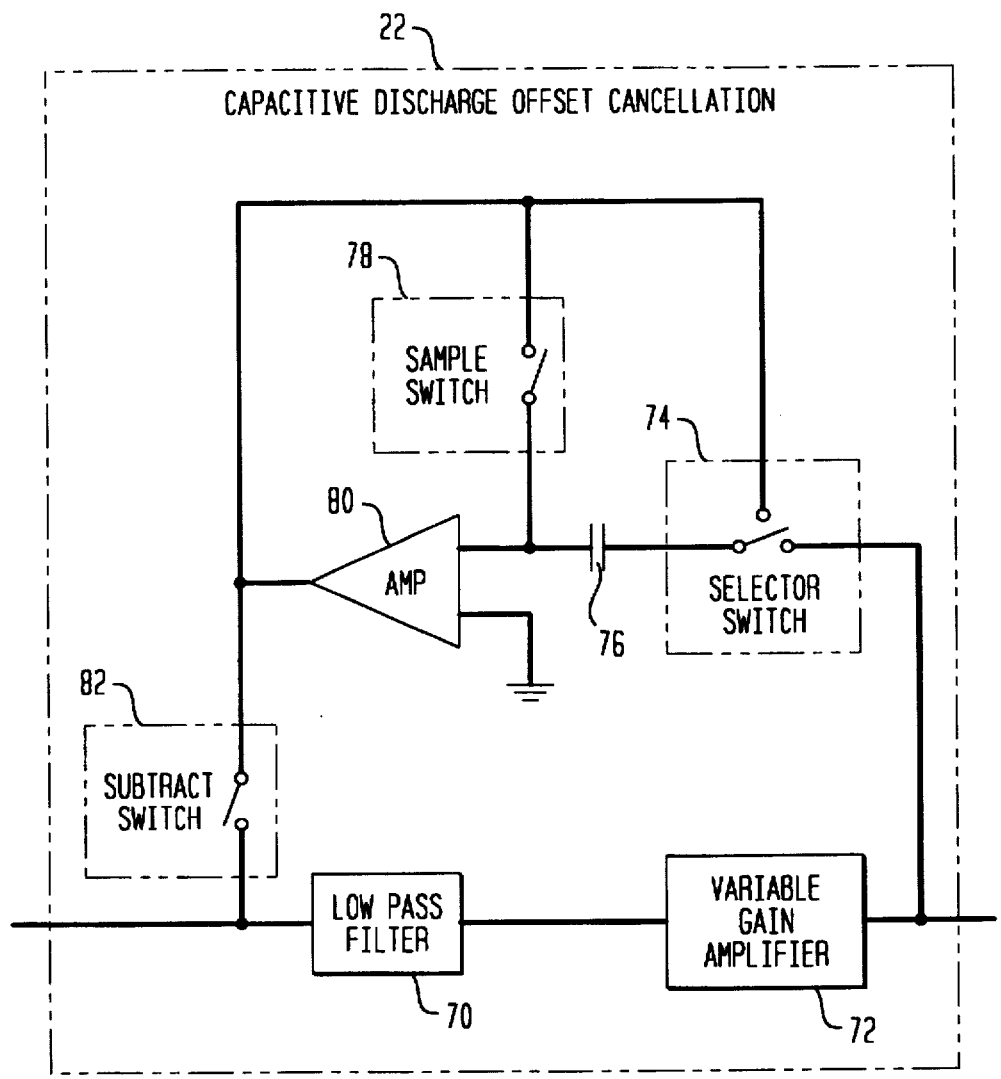
FIG. 1B is an illustration of another embodiment of the capacitive discharge offset cancellation module.

Referring to FIG. 1B is an illustration of another embodiment of the capacitive discharge offset cancellation module 22. The embodiment of the capacitive discharge offset cancellation module 22 comprises a low pass filter 70 which is adapted to receive the output signal from the mixer 20, which has a DC offset and an output of a subtract switch 82. The output of the low pass filter 70 is coupled to the input of a variable gain amplifier 72. The output of the variable gain amplifier 72 is coupled to a first output of a selector switch 74 and the switchable high pass filter 30. The selector switch 74 has an input which is coupled to a first output in response to a first control signal and a second output in response to a second control signal. The second output of the selector switch 74 is is coupled to a first side of a sample switch 78 and an input of the subtract switch 82. The input of the selector switch 74 is coupled to a first terminal of capacitor 76. A second terminal of the capacitor 76 is coupled to a second side of the sample switch and one input of an amplifier 80. A second input of the amplifier 80 is coupled to ground. An output of the amplifier 80 is coupled to the input of the subtract switch 82. The sample switch 78 is closed in response to the first control signal. The subtract switch 82 is closed in response to the second control signal. The first control signal is for sampling the initial offset. The second control signal is for subtracting the initial offset that was sampled.

Figure 2:
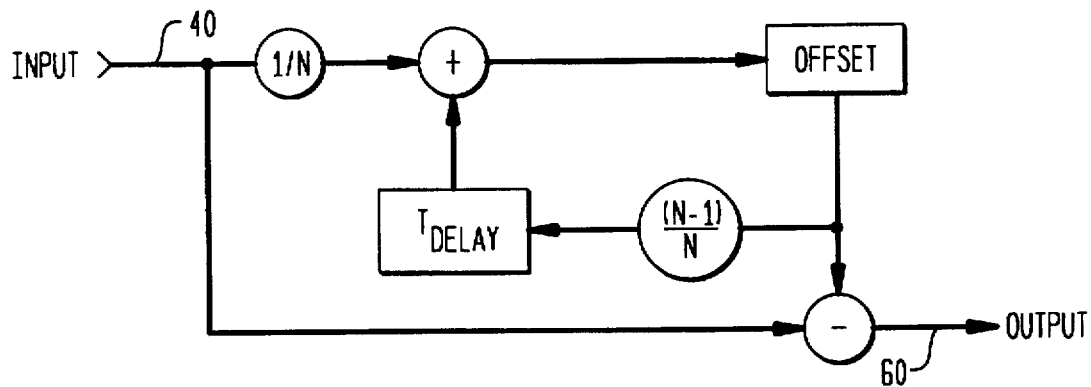
FIG. 2 is a flow diagram of a digital switched high pass filter of the present invention.

Referring to FIG. 2 there is illustrated a switchable digital filter, which is the preferred embodiment of the switchable high pass filter 30 shown in FIG. 1A. The input signal 40 is divided by N. The result of which is added to (N−1)/N times the delay offset estimate, providing a new offset estimate. The new offset estimate is subtracted from the input signal 40 which provides an output 50 with the offset removed. The delay $T_{DELAY}$ can be selected to be a sampling period which is half a symbol period. The bandwidth of the switchable digital filter is changed by changing the value of N. In the exemplary embodiment, the value of N would change from 4 to 200 when the timing lock is acquired.

While the exemplary illustration utilizes a switchable digital filter, it is possible to implement the switched high speed filter with a conventional RC filter, where the capacitor value is switched by a SiCMOS switch or other suitable means.

Synchronization lock detection is obtained by summing corrections from the timing recovery algorithm over a window and thresholding them. After the DC offset of the input signal has been removed, the synchronization word can be recognized. The timing of the receiver and the transmitter are thus synchronized during the acquire mode and the initial large DC offset of the input signal is quickly removed by the capacitive discharge offset cancellation circuit 22.

After synchronization the communication system is operated in the normal mode. However, synchronization is fine tuned during the normal mode, by using the timing recovery and a second order loop for frequency recovery.

In a frequency hopping (FH) communication system, the frequency may change between data frames, which will change the DC offset as a result of the local oscillator leakage. Additionally, path loss may differ at different frequencies, resulting in gain changes and thus changes in the circuit DC offsets.

In a TDD system, the local oscillator may be turned off or reset to the transmitter frequency between receive frames. The changes in the local oscillator frequency, as a result of the local oscillator leakage, the DC offsets change drastically.

Additional DC offset changes are induced by environmental conditions, including the position of the hand set.

The commutative effect of the changes to the DC offset of the input signal, is that the DC offset must be recalculated for each data frame. The correction for the DC offset during the acquire mode that is provided by the capacitive discharge offset cancellation module 22 primarily brings the DC offset down to a level which prevents the receiver from overloading.

Figure 3A:
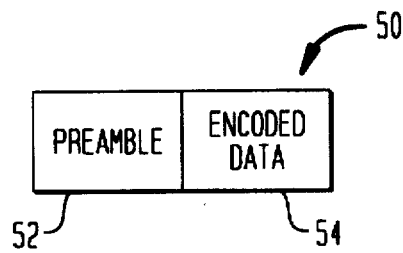
FIGS. 3A and 3B are block illustrations of data frames.

Referring to FIG. 3A there is shown a typical data frame 50 which consists of a preamble 52 and encoded data 54. In the normal mode of operation, the receiver must detect the data frame 50. The preamble 52 is utilized for timing correction and may contain a security code.

The preamble 52 which is at the beginning of each data frame 50, contains no DC component in the In phase or the Quadrature signal components. As the receiver 10 and transmitter (not shown) have been synchronized, timing is known with a high degree of accuracy, allowing the receiver 10 to accurately and reliably detect the preamble 52. The signal components, because they contain no DC component, can be averaged, resulting in the determination of an accurate DC offset that would be utilized for the current data frame 50.

In a cordless telephone system, the symbols PI/4 3PI/4 PI/4, when sampled at the symbol rate can be averaged to provide an accurate estimate of the DC offset. In a multiphase shift keying (MSK) system, such as GSM, the symbols 111 or 000 can be used to estimate the DC offset for a given data frame.

The residual DC offset is the result of any noise on the signal from the receiver. Utilizing a four sample offset measurement the noise power on the DC offset that is estimated is ¼ that of the original receiver noise. Subtracting this DC offset from the input signal results in a corrected signal having a noise penalty of only 1 dB. The noise can be further reduced by utilizing a longer preamble or a higher sampling frequency. However, lengthening the preamble within a given data frame reduces the amount of encoded data that may be contained. Further, increasing the sampling frequency to greater than twice the channel bandwidth provides no additional improvement in noise averaging.

Figure 3B:
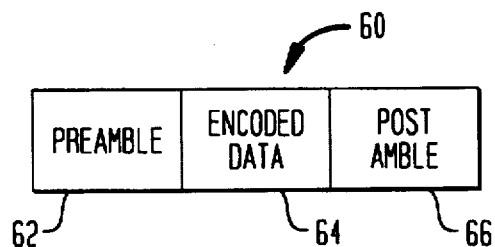

Referring to FIG. 3B there a data frame 60 which consists of a preamble 62, encoded data 64, and a post amble 66.

It is possible to store the entire data frame 60, utilize the preamble 62 and the post amble 66, to determine the DC offset. The remaining portion of the data frame, the encoded data 64 would be extremely complex and difficult to use in the calculation if the data is not pseudo random or balanced. Decision directed compensation could be utilized, however it is complex, utilizing a differentially encoded scheme, where an error will corrupt the predictions forward in time.

Numerous modifications and alternative embodiments of the invention will be apparent of those skilled in the art in view of the foregoing description. Accordingly, this description is to be construed as illustrative only and is for the purpose of teaching those skilled in the art the best mode of carying out the invention. Details of the structure may be varied substantially without departing from the spirit of the invention and the exclusive use of all modifications which come within the scope of the appended claim is reserved.

We claim:

1. A homodyne receiver device with DC offset correction comprising:
   demodulating means for demodulating an RF signal to produce a baseband signal, said baseband signal having a DC offset;
   a dynamic offset correction circuit adapted to receive said baseband signal and to determine therefrom a dynamic DC offset of said baseband signal and applying a dynamic offset correction to said baseband signal;
   timing means for acquiring a timing signal from said baseband signal for synchronization to a transmitter; and
   a switchable high pass filter having a first predetermined frequency cutoff and a second predetermined frequency cutoff adapted to receive said baseband signal, wherein said switchable high pass filter is selectively switched between said first predetermined frequency cutoff before synchronization and said second predetermined frequency cutoff after synchronization.

2. The homodyne receiver device as recited in claim 1 further comprising an initial offset correction circuit adapted to receive said baseband signal, and to determine therefrom an initial DC offset of said baseband signal and applying an initial offset correction to said baseband signal before said dynamic offset correction circuit.

3. The homodyne receiver device as recited in claim 2 wherein said initial offset correction circuit comprises:
   a capacitor having an input and an output, said input adapted to receive said baseband signal;
   a switch for shunting said output of said capacitor to a predetermined voltage potential for a predetermined period;
   wherein after shunting said output of said capacitor, said output provides an initial corrected signal, said initial corrected signal having said initial DC offset removed from said baseband signal.

4. The homodyne receiver device as recited in claim 2 further comprising timing means for acquiring a timing signal from said baseband signal after said initial offset correction circuit has applied said initial offset correction to said baseband signal for synchronization to a transmitter.

5. The homodyne receiver device as recited in claim 3 wherein said switch is a SiCMOS switch.

6. The homodyne receiver device as recited in claim 1 wherein said switchable high pass filter is an RC filter with an impedance value of C selectively switchable from a first predetermined impedance level to a second predetermined impedance level.

7. The homodyne receiver device as recited in claim 1 wherein said switchable high pass filter is a digital filter.

8. The homodyne receiver device as recited in claim 1 wherein said switchable high pass filter is switched and synchronization is acquired within a same data frame.

9. The homodyne receiver device as recited in claim 1 wherein said dynamic DC offset is related to an average potential value of a data frame.

10. The homodyne receiver device as recited in claim 1 wherein said dynamic DC offset is related to an average potential value of a preamble of a data frame.

11. A homodyne receiver device with DC offset correction comprising:
    demodulating means for demodulating an RF signal to produce a baseband signal, said baseband signal having a DC offset; and a dynamic offset correction circuit adapted to receive said baseband signal and to determine therefrom a dynamic DC offset of said baseband signal and applying a dynamic offset correction to said baseband signal;

wherein said dynamic offset correction circuit determines said dynamic DC offset after synchronization by storing a data frame and calculating an average potential value of a preamble of said data frame and a post amble of said data frame.

12. In a homodyne receiver having demodulating means for demodulating an RF signal to produce a baseband signal, a device for providing DC offset correction comprising:

initial offset correction circuit for determining an initial DC offset of said baseband signal and applying an initial offset correction to said baseband signal to provide an initial corrected baseband signal;

dynamic offset correction circuit for determining a dynamic DC offset of said initial corrected baseband signal and applying a dynamic offset correction to said initial corrected baseband signal;

timing means for acquiring a timing signal from said baseband signal for synchronization to a transmitter; and a switchable high pass filter having a first predetermined frequency cutoff and a second predetermined frequency cutoff adapted to receive said initial corrected baseband signal, wherein said switchable high pass filter is selectively switched between said first predetermined frequency cutoff before synchronization and said second predetermined frequency cutoff after synchronization.

13. The device as recited in claim 12 wherein said initial offset correction circuit comprises:

a capacitor having an input and an output, said input adapted to receive said baseband signal;

a switch for shunting said output of said capacitor to a predetermined voltage potential for a predetermined period;

wherein after shunting said output of said capacitor, said output provides an initial corrected baseband signal, said initial corrected signal having said initial DC offset removed from said baseband signal.

14. The device as recited in claim 13 wherein said switch is a SiCMOS switch.

15. The device as recited in claim 12 wherein said switchable high pass filter is an RC filter with an impedance value of C selectively switchable from a first predetermined impedance level to a second predetermined impedance level.

16. The device as recited in claim 12 wherein said switchable high pass filter is a digital filter.

17. The device as recited in claim 12 wherein said switchable high pass filter is switched and synchronization is acquired within a same data frame.

18. The device as recited in claim 12 wherein said dynamic DC offset is related to an average potential value of a data frame.

19. The device as recited in claim 12 wherein said dynamic DC offset is related to an average potential value of a preamble of a data frame.

20. In a homodyne receiver having demodulating means for demodulating an RF signal to produce a baseband signal, a device for providing DC offset correction comprising:

initial offset correction circuit for determining an initial DC offset of said baseband signal and applying an initial offset correction to said baseband signal to provide an initial corrected baseband signal; and dynamic offset correction circuit for determining a dynamic DC offset of said initial corrected baseband signal and applying a dynamic offset correction to said initial corrected baseband signal;

wherein said dynamic offset correction circuit determines said dynamic DC offset after synchronization by storing a data frame and calculating an average potential value of a preamble of said data frame and a post amble of said data frame.

21. A method for correcting a baseband signal having a DC offset in a homodyne receiver, said method comprising the steps of:

determining a dynamic DC offset of said baseband signal;

applying a dynamic offset correction to said baseband signal;

acquiring a timing signal from said baseband signal for synchronization to a transmitter; and switching a high pass filter from a first predetermined frequency cutoff to a second predetermined frequency cutoff after acquiring said timing signal.

22. The method as recited in claim 21 further comprising the steps of:

determining an initial DC offset of said baseband signal; and applying an initial offset correction to said baseband signal before determining said dynamic DC offset.

23. The method as recited in claim 21 wherein the step of acquiring said timing signal and switching said high pass filter occur within a single data frame.

24. The method as recited in claim 21 wherein the step of determining a dynamic DC offset comprises determining an average potential value of a data frame.

25. The method as recited in claim 21 wherein the step of determining a dynamic DC offset comprises determining an average a potential value of a preamble of a data frame.

26. A method for correcting a baseband signal having a DC offset in a homodyne receiver, said method comprising the steps of:

determining a dynamic DC offset of said baseband signal; and applying a dynamic offset correction to said baseband signal;

wherein the step of determining a dynamic DC offset comprises storing a data frame and calculating an average potential value of a preamble of said data frame and a post amble of said data frame.

* * * * *